Feb. 23, 1965

R. K. JOHNSON ETAL 3,170,364

RECESSED HEAD SCREW

Filed May 6, 1963

ROBERT K. JOHNSON
RUDOLPH J. CICCONI
*INVENTOR.*

BY James D. Givnan
ATT'Y

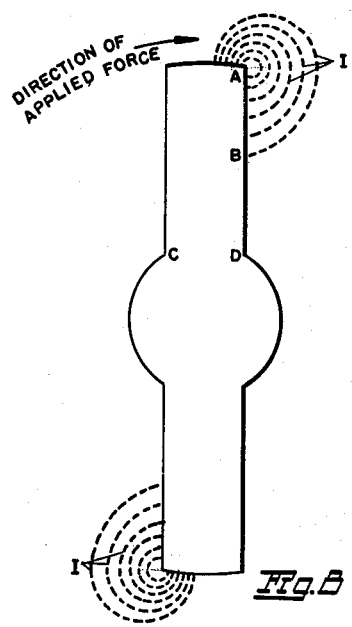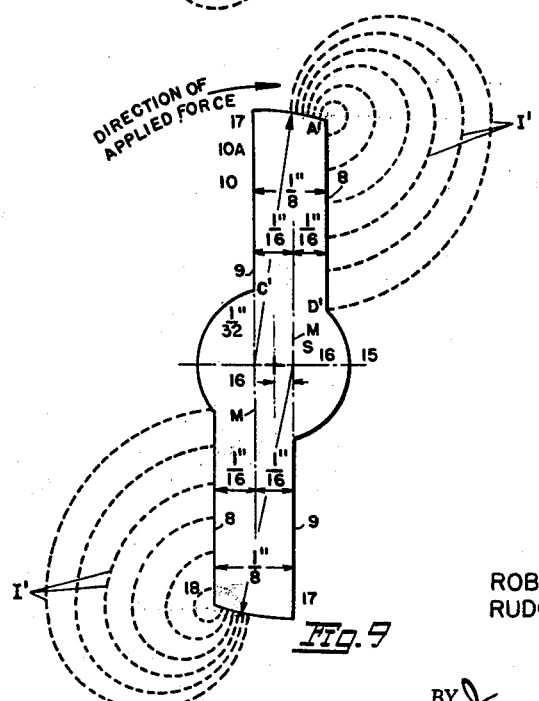

Feb. 23, 1965   R. K. JOHNSON ETAL   3,170,364
RECESSED HEAD SCREW
Filed May 6, 1963   3 Sheets-Sheet 3
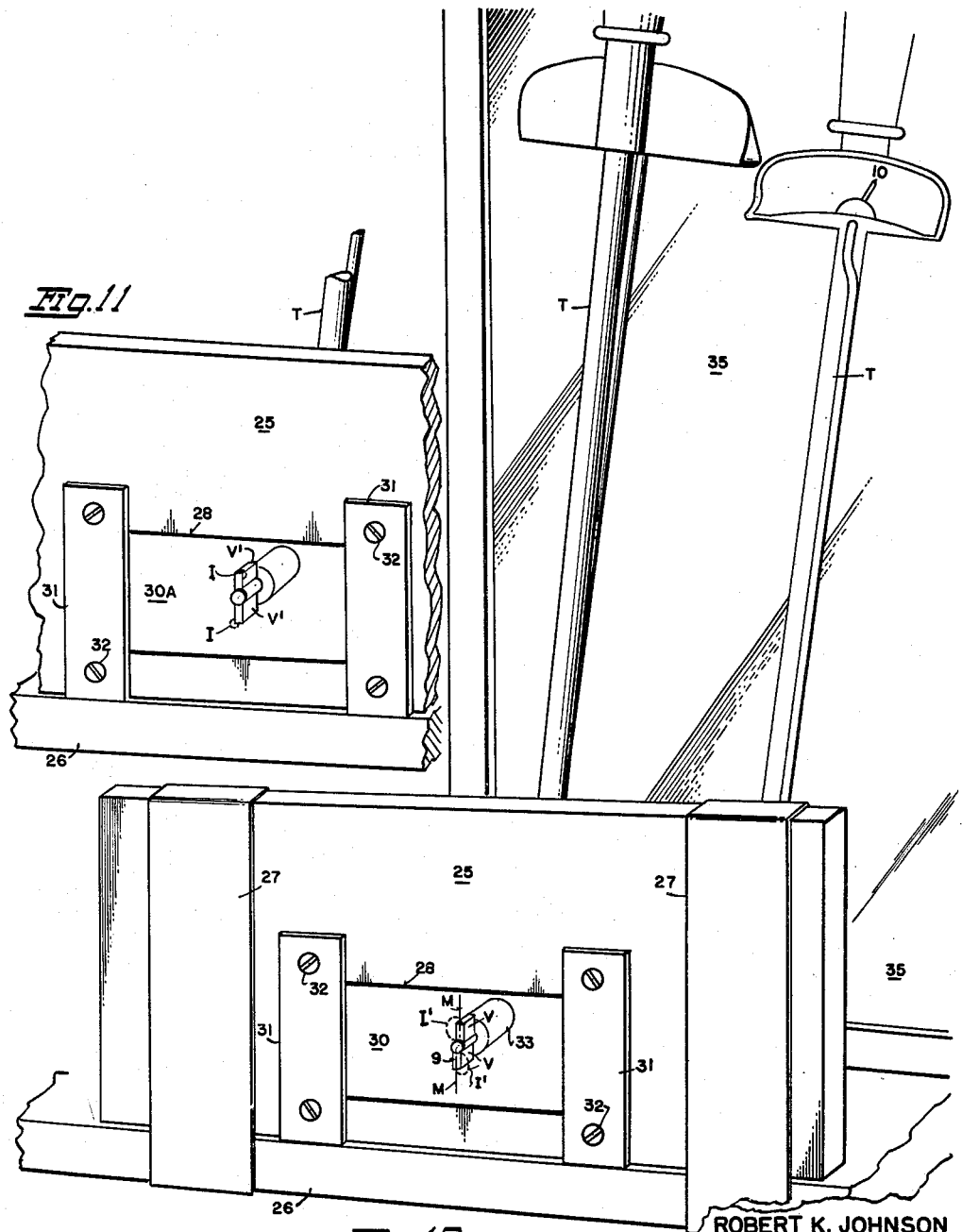
ROBERT K. JOHNSON
RUDOLPH J. CICCONI
INVENTOR.
BY *James T. Tiernan*
ATT'Y

United States Patent Office 3,170,364
Patented Feb. 23, 1965

3,170,364
RECESSED HEAD SCREW
Robert K. Johnson, 1535 Cleveland Ave., Glendale, Calif.,
and Rudolph J. Cicconi, 5101 Buffalo St., Sherman
Oaks, Calif.
Filed May 6, 1963, Ser. No. 278,163
1 Claim. (Cl. 85—45)

This invention relates to new and useful improvements in recessed head screws, bolts and the like, having right hand threads only and adapted to be driven in a clockwise direction of rotation by a special type of driver shown and described in our United States Patent No. 3,037,539, dated June 5, 1962.

This application is a continuation-in-part of our application filed June 30, 1959, Serial No. 823,882, entitled, Recessed Head Screw, now abandoned.

We are aware of developments in combination driving and driven elements, wherein the driving torque capacity has been somewhat improved over slotted screws. We are also aware of other developments, wherein attempts have been made to meet the demand for still greater torque capacity, but in all of these the deficiencies in their cooperating characteristics, and hence failure of attainment of maximum driving torque capacity, led to the development of the recessed head screw of the present invention, the principal objects of which are to:

Provide a screw head recess comprising identical radially offset grooves each having a driving wall and a back-out wall. The novel offset arrangement of the driving walls relative to each other and to the axis of the screw, presents a greater area of contact or bearing on the rigid central portion of the recess and imparts additional rigidity to the wing or vane of the matching driver or driving element, resulting in greater resistance to torque before either camming out or reaming the recess. There is thus also produced an ever increasing amount of introverted torque which effectively concentrates the pressure around the axis of the screw shank to thus develop and transmit extraordinary torque values to the screw in a clockwise direction of rotation. These high torque values are evenly distributed over the entire screw mutiplying the clamping action and holding power as much as 200 percent in excess of any screw of equal size and material.

The foregoing and other objects and advantages which will become subsequently apparent reside in the details of construction and operation as more fully hereinafter described and claimed, reference being had to the accompanying drawing forming a part hereof and in which:

FIGURE 8 is an enlarged diagrammatic view of the results of a laboratory test applied to the two diametrically aligned grooves in a block of plastic matching the grooves of a conventional cruciform recess in the head of a screw and showing in dotted line circles representative halations of internal lines of force in a clockwise direction obtained by orthochromatic registry of the test results.

FIGURE 9 is a view similar to FIGURE 8 showing the results of the same test applied to two grooves corresponding with either pair of the offset grooves of the screw head recess of the present invention, wherein it is obvious that the amount of force that can be applied to the driving walls of the grooves is in direct proportion to the distance the isochromatic lines spread along and throughout the face of the driving walls.

FIGURE 10 is a view illustrating the apparatus used for conducting the tests described in connection with FIGURES 8 and 9 and backed by a mirror to show the torque load applied to the recesses formed in the test block and conforming with the two designs of recesses shown in FIGURES 8 and 9, and FIGURE 11 is a view similar to FIGURE 10 with fragments broken away showing the result of the test of the recess of FIGURE 8.

Figure 1:
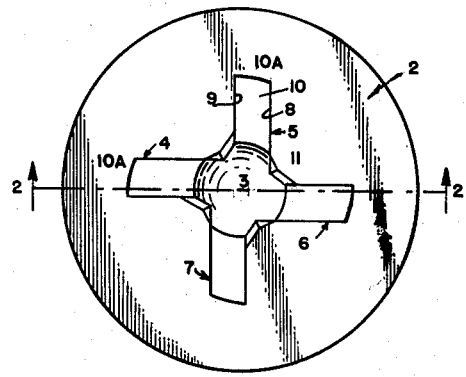
FIGURE 1 is a top plan view of a flat head screw provided with a tool-receiving recess made in accordance with our invention.
Figure 2:
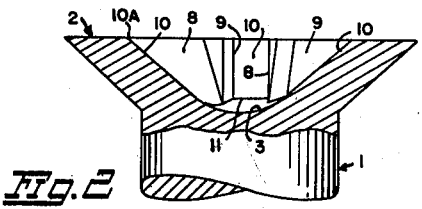
FIGURE 2 is a sectional elevational view taken approximately along the line 2—2 of FIGURE 1.

With continuing reference to the drawings wherein like references of character designate like parts, and particularly FIGURES 1 and 2 thereof, reference numeral 1 indicates a conventional screw shank terminating at its top end in a conventional flat head 2 having a central tool-receiving recess 3 therein formed on a true radius of curvature from a point on the axis of the screw within the head portion 2. It will be noted that the bottom of the recess is disposed just slightly below the line of demarcation between the head and the screw shank for a purpose to be more fully hereinafter pointed out.

In open communication with and radiating from the recess 3 are four identical grooves indicated generally at 4, 5, 6 and 7 and since they are identical a description of one will suffice for all. Each groove comprises what will be hereinafter referred to as a driving wall or clockwise wall 8, a back-out or counter clockwise wall 9 and a bottom wall 10 which wall 10 merges tangentially at its bottom inner end with the recess 3 at the rim 11 thereof and extends upwardly and outwardly therefrom with increasing radial magnitude into mergence as at 10A with the top flat surface of the screw head as shown in FIGURE 2 wherein it will also be seen that the overall area of the driving wall 8 is much greater than that of the back-out wall 9.

As shown in FIGURES 1 and 9 the grooves are radially offset relative to each other with both side walls 8 and 9 of each displaced from true radial planes and so that the driving wall 8 of each groove will be spaced farther from the true radial plane than its respective back-out wall 9.

In the development of the recessed head screw in accordance with this invention, applicants found that some of the elements or considerations in the order of importance which must be met in the successful design for attaining maximum driving torque capacity are as follows:

(1) That the driving walls of the recess must be offset farther from a longitudinal plane which contains the axis of the screw shank and forwardly of the clockwise direction of rotation of the screw shank with each of said back-out walls offset to a lesser extent than said driving walls from said shank axis-containing plane rearwardly relative to the clockwise direction of the screw shank, and that the back-out wall of each groove must be disposed on a vertical plane medial of a diametrically opposed groove.

(2) There must be no longitudinal taper of the driving walls of the recess. That is, the driving walls must be parallel with each other and with the screw axis so that in applying torque or twist in either direction the driver makes square contact in the axial sense with no accumulation of trailing tolerance.

(3) The application of driver torque should be square with the mating recess in a transverse plane perpendicular to the screw axis, and (4) The driver must make contact with the recess over a definite area rather than a single point or line, and the contacted area or driving wall of the recess grooves must be greater than that of the back-out wall thereof. It is obvious that high torque values applied to a driver making only point contact with the recess under extreme pressure will result in burring or mutilation of the recess.

Satisfactory removal of applicants' screw is actually corollary of the above considerations and is an essential requirement.

Both side walls of each groove are parallel with each other and hence with the longitudinal axis of the screw, and as best illustrated in FIGURE 9, the back-out wall 9 of one groove is on a plane "M" medial of its dimetrically opposed groove as evidenced by the fact that if, for example, the width of the groove is ⅛" as indicated, the distance from each of its side walls 8 and 9 to its respective medial line will be ¹⁄₁₆", also as indicated. It will also be noted in FIGURE 9 that both medial lines "M" are equidistantly spaced (¹⁄₃₂") along a transverse line 15 representing a plane containing the longitudinal axis of the screw shank and that the mergence of the bottom wall 10 with the top surface of the screw head is on a radius of curvature from the intersection 16 of line 15 with the medial line "M" of the opposing groove, thus locating the outside corner 17 of the back-out wall 9 a greater distance from the screw axis-containing plane 15 than the outside corner 18 of the driving wall of the same groove without in any way diminishing the greater overall area of the driving wall as compared with the lesser area of the back-out wall. The cam-like effect of such disposition of the grooves, contributes to the introverted driving torque to concentrate pressure around the axis of the screw in a clockwise direction.

Figure 3:
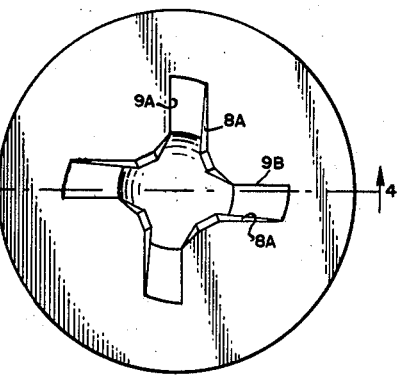
FIGURE 3 is a view similar to FIGURE 1 illustrating a modified form of the invention.
Figure 4:
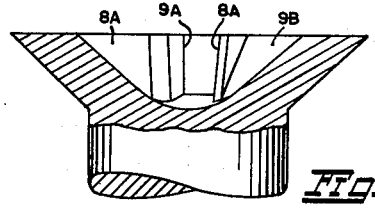
FIGURE 4 is a view similar to FIGURE 2 taken along the line 4—4 of FIGURE 3.

In the modification shown in FIGURES 3 and 4, the driving or clockwise wall 8A of each groove tapers from the top surface of the head toward the axis of the screw on an angle calculated to cause the driver to "cam out" when the torque load becomes equal to the capacity of the back-out wall 9A for the same load. Thus the driving torque and back-out torque are of equal values.

Moreover, the inclined wall of the driving slot 8A facilitates driver entry, which is desirable on production lines, and the like, where power drivers are used and the application of the screws to the driver is in such rapid succession that in many instances workmen attempt to apply the screw to the driver before the driver bit has come to a complete stop.

Figure 5:
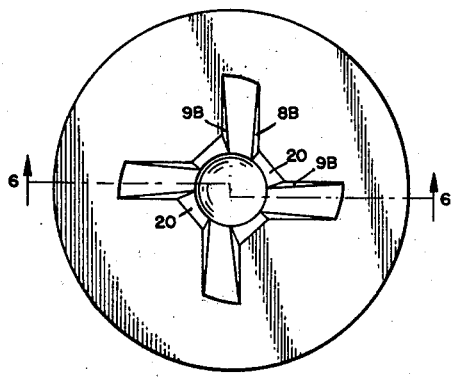
FIGURE 5 is a view similar to FIGURE 1 showing a further modification.
Figure 6:
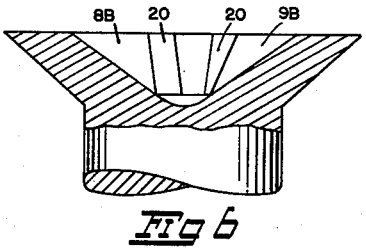
FIGURE 6 is a view similar to FIGURE 4 taken along the line 6—6 of FIGURE 5.

In the further modification shown in FIGURES 5 and 6, the driving walls 8B and the back-out walls 9B are both tapered toward the axis of the screw and the driving wall of each groove is connected with the wall 9B of the adjacent groove through the intermediary of walls 20, and these walls are tapered toward the axis of the screw on an angle of inclination preferably of the order of that of machine tool centers or variations therefrom as determined by experiment to provide a socket that will be firmly and detachably engaged by a correspondingly formed driver bit.

Figure 7:
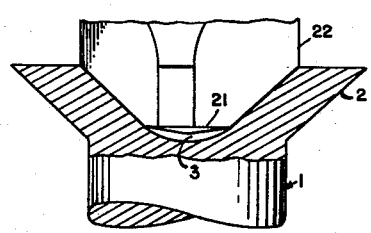
FIGURE 7 is a view typical of FIGURES 2, 4, and 6 illustrating the fact that a driving element made in accordance with our United States Patent No. 3,037,539, above identified cannot "bottom" in any of the recesses herein shown and described.

The cup-shaped recess 3 and its location relative to the line of demarcation between the head and shank of the screw, as shown in FIGURE 7, serves two important purposes. One is that it prevents the squared end 21 of a driver bit 22 from "bottoming" in the recess, and the other is that neither the screw shank nor the head is weakened to the extent that it would be if the recess 3 were of conical shape and extended downwardly into the shank.

The foregoing new and novel features and characteristics of applicants' invention are in contrast to the groove arrangement or relationship of the grooves in the socketed screw head shown in United States patent to Smith et al., No. 2,847,894, dated August 19, 1958 and a reissue thereof No. Re. 24,878, dated September 27, 1960, wherein and because counter clockwise or back-out torque for the removal of the patented screw does not take place on a radial plane it must be compensated by the necessarily increased surface area of the back-out walls over that of the driving walls which driving walls are on a plane containing the longitudinal axis of the screw thus effecting direct action on a true radial plane with all tolerance accumulation on the trailing or back-out walls of the driver. In reverse or back-out rotation of the patented screw, absorption of the accumulated tolerance or lost motion by the driver results in failure to meet the desideratum set for in item 2 of the foregoing list of important elements or considerations which must be met in the successful design for attaining maximum driving torque capacity.

Similarly, United States patent to Vaughn, No. 2,954,719, dated October 4, 1960, illustrates a recess for the reception of a special driver, wherein it is evident that when the screw driver is torqued in a clockwise direction, the engaging surfaces are of considerably smaller area than when torqued in a counter clockwise direction with the desired results, Vaughn claims, that the maximum troque which may be applied in tightening the screw is limited by the tendency for the driver to cam out of the slot as a consequence of yielding of the slot edges defining the reduced area nonplanar curved engaging surfaces.

United States patent to Tomalis No. 2,474,994 dated July 5, 1949 discloses the so-called "Phillips" recess wherein both side walls 18 thereof are of equal area and converge toward each other downwardly from the surface of the screw head. Contact of tapered cooperating matching vanes on the driver with the tapered walls of the recess serves to counteract the component of axial thrust so that under extreme driving conditions where the friction is increased by the added torque the operator is not required to exert any considerable effort to retain the driver bit in the recess. Since the driving walls and back-out walls are of equal area, the absorption of torque values by one wall could never be greater than that of the other.

The precise offset relationship of the walls of the grooves to each other and to the longitudinal axis of the screw in applicants' invention results in the provision of a driving wall 8 on the clockwise side of the groove against which a greater driving force per unit of area can be applied in attaining maximum torque capacity without wall deflection or multilation than that which could be applied to the opposite or back-out wall 9, as evidenced by the photostress analysis tests referred to in the description of FIGURES 8 and 9, wherein the test fundamentals are the same as those covering classic photoelasticity.

The apparatus used in conducting the photostress analysis, above referred to, comprises a main body 25 of heavy plate securely anchored to a table top or work bench 26 by straps 27 and provided with a rectangular opening 28 within which is securely held a block of plastic 30 by means of plates 31 and suitable fasteners 32 driven into the plate 25.

Two diametrically offset grooves representative of any two of such grooves of the present invention were sunk in the plastic block 30 to receive the vanes V of a matching driver bit 33 for the recess grooves. Two grooves of applicants' screw were used instead of four as it was felt that two grooves would give the same qualitative answers and that no trouble with overlapping lines of force with their complex line patterns would be encountered.

It will be noted in FIGURE 10 that the grooves used in the test block and the vanes V of the matching driver bit were arranged relative to each other in precisely the same manner as the offset grooves of FIGURES 1 and 9, namely, with the back-out wall 9 of each vane disposed on a plane "M" medial of the opposing vane.

By means of a torque wrench T, 10 foot pounds or 120 inch pounds of constant torque was applied to the driver bit 33 and the grooves in the block in a counter clockwise direction as viewed in FIGURE 10.

A mirror 35 was placed back of the torque wrench T for observance of the pointer setting on the dial of the torque wrench which indicated the torque values above mentioned. The resulting patterns of colored light or halations I¹ in the plastic block 30 showed the internal lines of force and how the pressure was distributed. As is well known, every solid is a plastic to a degree and for the purpose of this analysis, this degree may be termed the material's "coefficient" of plasticity. One of the limits of this coefficient is the elastic limits of the material. If the elastic limits are exceeded, the material will either fracture or take a permanent set. In conducting these tests the elastic limits of the plastic block 30 was not exceeded. If material is compressed below its elastic limit, it follows that the material behind the compression face stretches. This is also true in the metal of a screw head as it is in plastic. In a screw head the metal enclosing the recess is contiguous around the ends of the grooves as well as underneath them. When the material ahead of the driving wall of the grooves is compressed (below the elastic limits of the material) the following material is pulled or dragged around the end of the grooves and underneath the recess. This pulling apart or extension of the intergranular tensions is also revealed by the same above mentioned halations (FIGURE 9) either back of and/or below the back-out wall.

In FIGURE 11, we have illustrated the torque testing of the so-called "Phillips" (Tomalis) recess, by the same apparatus shown in FIGURE 10, wherein the grooves of the recess and matching driver vanes V¹ are in alignment on a true radial plane. The same torque values, namely, 10 foot pounds or 120 inch pounds of constant torque were applied by the torque wrench T. The resultant isochromatic lines I were concentrated sharply in the driving direction at point A (FIGURE 8) and spread to point B less than half way between A and D (D being the point of contact between the driver vane and the rigid central portion of the recess).

The conclusion reached from these tests is that the amount of force that can be applied to the driving wall 8 of applicants' invention is in indirect proportion to the distance the isochromatic lines I' spread along its face. In this case, there was attained, as clearly shown in FIGURE 9, a ratio which is almost exactly what was found in an earlier test, conducted by a research and testing laboratory, namely 165 inch pounds "setting torque" to 310 inch pounds "maximum" and it may be even more since in that test, the driving bit fractured.

In further explaining these tests and bearing in mind as above pointed out that for all practical purposes all material is plastic to some degree, it is to be noted that the distance from C' to D' in FIGURE 9 is greater than the distance from C to D in FIGURE 8. This greater area of contact or bearing on the rigid central portion of the recess imparts additional rigidity to the vane of the matching driver resulting in greater resistance to torque before either camming out of or reaming the recess. With an ever increasing amount of torque the isochromatic lines I' arrives at point D' twice as fast in applicants' recess as they do at D in the type of recess shown in FIGURE 8, therefore, there is produced in applicants' recess the introverted torque which effectively concentrates the pressures around the axis of the screw shank to thus develop and transmit extraordinary high torque values to the screw in a clockwise direction of rotation. These high torque values are evenly distributed over the entire screw multiplying the clamping action and holding power as much as 200 percent in excess of any screw of equal size and material.

While we have shown particular forms of embodiment of our invention, we are aware that many minor changes therein will readily suggest themselves to others skilled in the art without departing from the spirit and scope of the invention. Having thus described our invention what we claim as new and desire to protect by Letters Patent is:

A right-hand threaded screw shank provided with a flat head having a centrally disposed recess and grooves extending upwardly and outwardly from the recess,
  each of said grooves having a driving wall, a back-out wall and a flat bottom wall,
  said bottom wall extending tangentially upwardly and outwardly from the rim of the recess with increasing radial magnitude into mergence with the top flat surface of the screw head,
  said driving and back-out walls being parallel with each other and with the longitudinal axis of the screw shank, and to a plane containing a radius
  each of said driving walls being of greater area than that of said back-out walls and offset from a longitudinal plane which contains said longitudinal axis of the screw shank and forwardly of the clockwise direction of rotation of the screw shank,
  each of said back-out walls offset to a lesser extent than said driving walls from said shank axis-containing plane and rearwardly relative to the clockwise direction of rotation of the screw shank,
  the back-out wall of each groove disposed on a vertical plane medial of a diametrically opposed groove,
  said mergence of the bottom wall of each groove with the flat top surface of the screw head being on a radius of curvature from a point offset from the longitudinal axis of the screw shank and lying in a plane which passes through the longitudinal axis at right angles to the walls of the groove, whereby the outside corner of the back-out wall is at a greater distance from said axis of the screw shank than the outside corner of the driving wall, and whereby clockwise forces of a rotating driver bit applied to and absorbed by said driving walls will impart introverted torque of maximum capacity to the screw shank in a clockwise direction of rotation.

References Cited in the file of this patent

UNITED STATES PATENTS

| | | |
|---|---|---|
| Re. 24,878 | Smith et al. | Sept. 27, 1960 |
| 2,216,382 | West et al. | Oct. 1, 1940 |
| 2,556,155 | Stellin | June 5, 1951 |
| 2,954,719 | Vaughn | Oct. 4, 1960 |